(12) United States Patent
Yu et al.

(10) Patent No.: US 8,994,899 B2
(45) Date of Patent: Mar. 31, 2015

(54) POLARIZING PLATE COMPRISING A POLYETHYLENE TEREPHTHALATE FILM HAVING AN IN-PLANE PHASE DIFFERENCE AND A COATING LAYER HAVING A HAZE VALUE AND LIQUID CRYSTAL DISPLAY PROVIDED WITH THE SAME

(75) Inventors: So-Hee Yu, Uiwang-si (KR); Tae-Hwan Kwon, Uiwang-si (KR); Jae-Bin Song, Uiwang-si (KR); Hae-Ryong Chung, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 205 days.

(21) Appl. No.: 13/353,395

(22) Filed: Jan. 19, 2012

(65) Prior Publication Data

US 2012/0113356 A1 May 10, 2012

Related U.S. Application Data

(63) Continuation of application No. PCT/KR2010/004993, filed on Jul. 29, 2010.

(30) Foreign Application Priority Data

Aug. 5, 2009 (KR) .................. 10-2009-0072156
Jul. 27, 2010 (KR) .................. 10-2010-0072454

(51) Int. Cl.
*G02F 1/1335* (2006.01)
*G02B 5/30* (2006.01)
*G02F 1/13363* (2006.01)

(52) U.S. Cl.
CPC .......... *G02B 5/305* (2013.01); *G02F 1/133528* (2013.01); *G02F 1/13363* (2013.01)
USPC ........................................................... 349/96

(58) Field of Classification Search
USPC .................................................. 349/96–105
See application file for complete search history.

(56) References Cited

U.S. PATENT DOCUMENTS

| 7,012,660 | B1 | 3/2006 | Umemoto | |
|---|---|---|---|---|
| 2002/0034013 | A1 | 3/2002 | Nakamura et al. | |
| 2002/0054261 | A1* | 5/2002 | Sekiguchi | 349/122 |
| 2002/0180910 | A1* | 12/2002 | Umemoto et al. | 349/113 |
| 2002/0186461 | A1* | 12/2002 | Saiki et al. | 359/352 |
| 2004/0239834 | A1 | 12/2004 | Park et al. | |
| 2007/0002231 | A1* | 1/2007 | Lee et al. | 349/117 |
| 2008/0233312 | A1* | 9/2008 | Nakamura et al. | 428/1.31 |

(Continued)

FOREIGN PATENT DOCUMENTS

| CN | 1388402 A | 1/2003 |
|---|---|---|
| CN | 101151558 A | 3/2008 |

(Continued)

OTHER PUBLICATIONS

International Search Report in PCT/KR2010/004993, dated Mar. 3, 2011 (Yu, et al.).

(Continued)

*Primary Examiner* — Paul Lee
(74) *Attorney, Agent, or Firm* — Lee & Morse, P.C.

(57) ABSTRACT

A polarizing plate includes a polarizer, a thin film on the polarizer, the thin film having an in-plane phase difference (Ro) of about 500 nm to about 3000 nm, and a coating layer disposed on one side of the thin film and having a haze value of about 15% to about 35%.

16 Claims, 2 Drawing Sheets

(56) References Cited

U.S. PATENT DOCUMENTS

| | | |
|---|---|---|
| 2009/0079910 A1 | 3/2009 | Ito et al. |
| 2009/0161053 A1* | 6/2009 | Kaneiwa et al. ............. 349/117 |
| 2009/0251643 A1* | 10/2009 | Yamada et al. ................ 349/96 |
| 2010/0007828 A1* | 1/2010 | Nimura et al. ................ 349/117 |
| 2010/0209723 A1 | 8/2010 | Tanaka et al. |

FOREIGN PATENT DOCUMENTS

| | | |
|---|---|---|
| CN | 101243337 A | 8/2008 |
| JP | 07-027920 A | 1/1995 |
| JP | 2002-036476 A | 2/2002 |
| JP | 2002-040250 A | 2/2002 |
| JP | 2002-055206 A | 2/2002 |
| JP | 2006-010829 A | 1/2006 |
| JP | WO2007-020909 A1 | 2/2007 |
| JP | 4110434 B1 | 4/2008 |
| JP | 4218102 B1 | 11/2008 |
| JP | 2009-014886 A | 1/2009 |
| JP | 2009-109993 A | 5/2009 |
| JP | 2009-157348 A | 7/2009 |
| KR | 10 2006-0050119 A | 5/2006 |
| KR | 10-2006-0110127 A | 10/2006 |
| KR | 10-0659573 B | 12/2006 |
| KR | 10-0771950 B | 10/2007 |
| KR | 10 2007-0116309 A | 12/2007 |
| KR | 10 2008-0043309 A | 5/2008 |
| KR | 10-2009-0037826 A | 4/2009 |
| TW | I239419 | 9/2005 |
| TW | 200712579 | 4/2007 |
| TW | 200912365 | 3/2009 |
| TW | 200920780 | 5/2009 |
| TW | 200932524 | 8/2009 |
| WO | WO 2007/020909 A1 | 2/2007 |

OTHER PUBLICATIONS

Taiwanese Search Report in TW 99125881, dated Aug. 30, 2013, with English translation (Yu, et al.).

Chinese Search Report in CN 2010800335217, dated Nov. 7, 2013 (Yu, et al.).

* cited by examiner

POLARIZING PLATE COMPRISING A POLYETHYLENE TEREPHTHALATE FILM HAVING AN IN-PLANE PHASE DIFFERENCE AND A COATING LAYER HAVING A HAZE VALUE AND LIQUID CRYSTAL DISPLAY PROVIDED WITH THE SAME

CROSS-REFERENCE TO RELATED APPLICATION

This application is a continuation of pending International Application No. PCT/KR2010/004993, entitled "Polarizer and Liquid Crystal Display Provided with the Same," which was filed on Jul. 29, 2010, the entire contents of which are hereby incorporated by reference and for all purposes.

BACKGROUND

1. Field

Embodiments relate to polarizing plate and a liquid crystal display (LCD) provided with the same.

2. Description of the Related Art

A liquid crystal display (LCD) is one of the flat panel displays that are currently being widely used. A liquid crystal display (LCD) includes a liquid crystal panel including two display panels including electric field generating electrodes, and a liquid crystal layer between them. It displays an image by applying a voltage to the electric field generating electrodes and producing an electric field in the liquid crystal layer, and thus determines arrangement of liquid crystal molecules and controls polarization of light entered therein.

SUMMARY

An embodiment is directed to a polarizing plate, including a polarizer, a thin film on the polarizer, the thin film having an in-plane phase difference (Ro) of about 500 nm to about 3000 nm, and a coating layer disposed on one side of the thin film and having a haze value of about 15% to about 35%.

The thin film may be a polyethylene terephthalate film.

The polarizing plate may further include an adhesive layer interposed between the polarizer and the polyethylene terephthalate film. The adhesive layer may be formed of an adhesive including polyvinyl alcohol and a cross-linking agent, the cross-linking agent may include a compound with an aldehyde group, and the cross-linking agent may be included in an amount of about 0.5 wt % to about 1.5 wt % based on the total amount of polyvinyl alcohol.

The cross-linking agent may include a polyethylene imine, glyoxal, or a combination thereof.

The polarizing plate may further include at least one of a first auxiliary adhesive layer interposed between the polyethylene terephthalate film and the adhesive layer, the first auxiliary adhesive layer including a polyester-based resin, a polyvinyl acetate-based resin, or a combination thereof; and a second auxiliary adhesive layer interposed between the polyethylene terephthalate film and the coating layer, the second auxiliary adhesive layer including a polyester-based resin, a polyvinyl acetate-based resin, or a combination thereof.

The polyethylene terephthalate film may have a thickness of about 25 μm to about 60 μm.

The polyethylene terephthalate film may include an ultraviolet (UV) absorber, and has transmittance of less than about 10% at about 380 nm.

Another embodiment is directed to a liquid crystal display (LCD) including a polarizing plate according to an embodiment disposed at a front side thereof.

Another embodiment is directed to a liquid crystal display (LCD), including a liquid crystal panel, the liquid crystal panel including first and second substrates facing each other, and including a liquid crystal layer disposed between the first and second substrates, a backlight part configured to supply light to a back side of the liquid crystal panel, a first polarizing plate positioned at a front side of the liquid crystal panel, the first polarizing plate including a polarizer, a thin film on the polarizer, the thin film having an in-plane phase difference (Ro) of about 500 nm to about 3000 nm, and a coating layer disposed on one side of the thin film and having a haze value of about 15% to about 35%, and a second polarizing plate positioned between the liquid crystal panel and the backlight part.

The thin film may be a polyethylene terephthalate film.

The LCD may further include an adhesive layer interposed between the polarizer and the polyethylene terephthalate film. The adhesive layer may be formed of an adhesive including polyvinyl alcohol and a cross-linking agent, the cross-linking agent may include a compound having an aldehyde group, and the cross-linking agent may be included in an amount of about 0.5 wt % to about 1.5 wt % based on the total amount of polyvinyl alcohol.

The cross-linking agent may include a polyethylene imine, glyoxal, or a combination thereof.

The LCD may further include at least one of a first auxiliary adhesive layer interposed between the polyethylene terephthalate film and the adhesive layer, the first auxiliary adhesive layer including a polyester-based resin, a polyvinyl acetate-based resin, or a combination thereof; and a second auxiliary adhesive layer interposed between the polyethylene terephthalate film and the coating layer, the second auxiliary adhesive layer including a polyester-based resin, a polyvinyl acetate-based resin, or a combination thereof.

The polyethylene terephthalate film may have a thickness of about 25 μm to about 60 μm.

The polyethylene terephthalate film may include an ultraviolet (UV) absorber with transmittance of less than about 10% at about 380 nm.

The LCD may have a TN mode, and may further include a WV compensation film positioned on a back side of the polyethylene terephthalate film, the WV compensation film including a discotic liquid crystal.

The LCD may have a VA mode, and may further include a drawn TAC-based compensation film positioned on a back side of the polyethylene terephthalate film.

The LCD may be a horizontal electric field type, and may further include an A plate, a C plate, or a mixed compensation film thereof on a back side of the polyethylene terephthalate film.

BRIEF DESCRIPTION OF THE DRAWINGS

Features will become apparent to those of skill in the art by describing in detail example embodiments with reference to the attached drawings in which.

DETAILED DESCRIPTION

Figure 1:
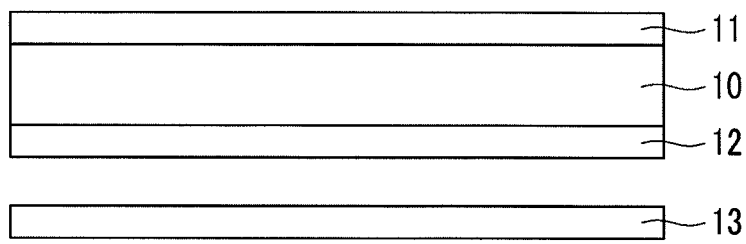
FIG. 1 illustrates a cross-sectional view of an LCD according to an example embodiment.

Korean Patent Application No. 10-2009-0072156, filed on Aug. 5, 2009, and Korean Patent Application No. 10-2010-

0072454, filed on Jul. 27, 2010, in the Korean Intellectual Property Office, and entitled: "Polarizer and Liquid Crystal Display Provided with the Same," are incorporated by reference herein in their entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a liquid crystal display according to an example embodiment is described in detail referring to FIG. 1.

FIG. 1 illustrates a cross-sectional view of an LCD according to an example embodiment.

In the example embodiment shown in FIG. 1, the liquid crystal display (LCD) includes a liquid crystal panel 10, a backlight part 13 on the back side of the liquid crystal panel 10, and a pair of polarizing plates 11 and 12 respectively attached to both sides of the liquid crystal panel 10.

The liquid crystal panel 10 may include first and second substrates (not shown) and a liquid crystal layer (not shown) disposed therebetween. The first substrate may include a thin film transistor (not shown) and a pixel electrode (not shown) connected thereto, while the second substrate may include a color filter (not shown) and a common electrode (not shown).

The backlight part 13 may supply the liquid crystal panel 10 with light, and may include a fluorescent lamp, a light emitting element (LED), or the like.

In the example embodiment shown in FIG. 1, the polarizing plate 11 is disposed on the front side of the liquid crystal panel 10, the other polarizing plate 12 is attached to the back side of the liquid crystal panel 10, and the front and back polarizing plates 11 and 12 have different structures.

Figure 2:
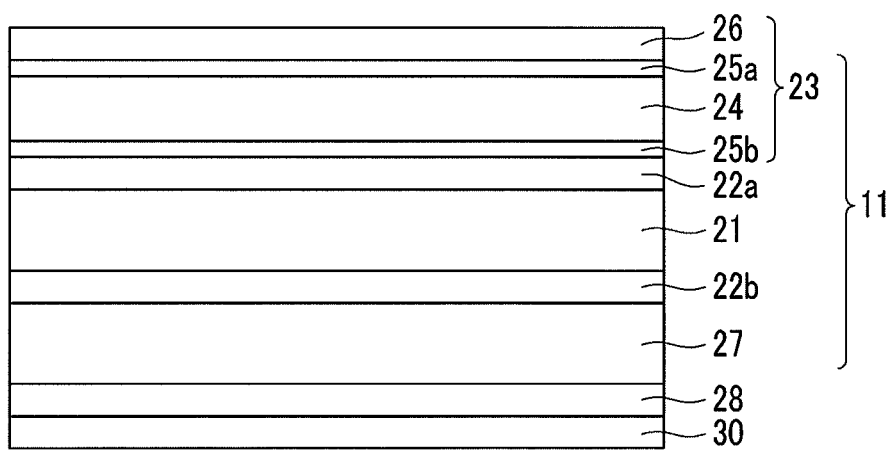
FIG. 2 illustrates a cross-sectional view of a front-side polarizing plate according to an example embodiment.

An example of the front polarizing plate 11 is illustrated in FIG. 2.

FIG. 2 illustrates a cross-sectional view of a front-side polarizing plate according to an example embodiment.

Referring to FIG. 2, a front polarizing plate 11 may include a polarizer 21, a protection layer 23 disposed on top of the polarizer 21, an optical compensation film 27 disposed beneath the polarizer 21, an adhesive layer 22a adhering the polarizer 21 to the protection layer 23, and another adhesive layer 22b adhering the polarizer 21 to the optical compensation film 27. Also illustrated is a releasing film 30 (disposed beneath the optical compensation film 27) that is to be removed when the upper polarizing plate 11 is attached on top of the liquid crystal panel 10. A pressure sensitive adhesive layer 28 may be disposed between the optical compensation film 27 and the releasing film 30.

The polarizer 21 may be generally made of a drawn polyvinyl alcohol (PVA), for example, by drawing a polyvinyl alcohol film, causing iodine or a different type or color of dye to be absorbed therein, treating the resulting product with boric acid, and cleaning it.

The protection layer 23 may include a thin film 24 transmitting light polarized by the polarizer 21, the thin film 24 having an in-plane phase difference (Ro) of about 500 nm to about 3000 nm. A coating layer 26 may be disposed on the then film 24.

The thin film 24 may include polyethylene terephthalate (PET) (hereinafter, referred to as "polyethylene terephthalate film"). The polyethylene terephthalate film is a polymer having ethylene terephthalate as a main unit, and may be drawn and thus may have a direction. In addition, the polyethylene terephthalate film may be prepared by copolymerizing a carboxylic acid monomer and a diol-based monomer as well as the monomer including ethylene terephthalate.

The polyethylene terephthalate film may compensate a phase difference and adjust a draw ratio and the like, and thus may have the above-described in-plane phase difference.

The polyethylene terephthalate film may have a thickness of about 25 μm to about 60 μm.

The polyethylene terephthalate film may be included in a protection layer. Thus, the protection layer may have similar transmittance and mechanical strength to a triacetyl cellulose film but with a low cost, and it may replace the triacetyl cellulose film.

The polyethylene terephthalate film may include an ultraviolet (UV) absorber to prevent degradation of the polarizing plate. The ultraviolet (UV) absorber may reduce or prevent externally-entered ultraviolet (UV) rays from reaching a polarizer and a liquid crystal panel, and thus reduce or prevent deterioration of the polarizer by the ultraviolet (UV) rays.

The polyethylene terephthalate film may have transmittance of about 10% or less at a wavelength of about 380 nm.

When the polyethylene terephthalate film includes an ultraviolet (UV) absorber, it may have a transmittance decrease only at a short wavelength region of about 380 nm or less, whereas it may have little or no transmittance decrease from to the ultraviolet (UV) absorber at most wavelength regions including a visible region.

In contrast, a triacetyl cellulose film (a general polarization film) may have a transmittance decrease at a wavelength region of about 380 nm or more. Thus, it may have a transmittance decrease at most wavelength regions including a visible region, generally decreasing transmittance of a liquid crystal display (LCD).

In the example embodiment shown in FIG. 2, the coating layer 26 is disposed on top of the thin film 24. The coating layer 26 may have an anti-glare property with a haze value of about 15% to about 35%. Providing a haze value range within the aforementioned in-plane phase difference (Ro) range of a thin film, that is, from about 500 nm to about 3000 nm, may avoid a color stain. In particular, when a liquid crystal panel includes a polyethylene terephthalate film as a protection layer on the front side, the polyethylene terephthalate film may change the phase difference of a light polarized through the liquid crystal panel 10 and the polarizer 21. However, light may leak at the side, which may produce a color stain, resulting in deterioration of display characteristics. According to an example embodiment, the light leakage may be reduced or prevented by including a coating layer applying a haze value of about 15% to about 35% in the polyethylene terephthalate film having an in-plane phase difference (Ro) of about 500 nm to about 3000 nm. Thus, light leaking from the side may be diffused and may not be detected outside, preventing deterioration of the display characteristic.

A method of applying anti-glare property having a haze value within the range to the coating layer 26 may include a method of forming protrusions and depressions on the surface of a coating layer 26, a method of mixing anti-glare particles including an inorganic material, an organic material, or a combination thereof with a resin, a method of forming a multi-layered thin film, and the like. Herein, the resin may be a transparent resin, for example, a photo-cured resin or a thermosetting resin.

When anti-glare particles are mixed with a resin, the particles may be a single transparent polymer resin or a mixture of two or more transparent polymer resins with different refractive indexes.

When two or more transparent polymer resins with different refractive indexes are mixed together, two or more anti-glare particles may be controlled regarding anti-glare property by adjusting the refractive index difference and particle size thereof.

According to the embodiment, the two or more anti-glare particles may have a refractive index difference of about 0.04 or more, or about 0.04 to about 0.1 in another embodiment. When they have a refractive index difference within the range, the coating layer may decrease light leakage but still effectively have a haze value within the aforementioned range.

The multi-layered thin film may include two or more layers with different refractive indexes. Herein, thin films with low and high refractive indexes may have a refractive index difference of about 0.05 or more, securing a haze value within the aforementioned range. In particular, the thin film with a high refractive index may be made of a material with a refractive index of about 1.55 to about 2.40, and the thin film with a low refractive index may be made of a material with a refractive index of about 1.35 to about 1.50. In addition, the thin film with a high refractive index may include inorganic oxide particles with a high refractive index. The thin film with a low refractive index may be made of a fluorine resin including a hydroxyl group.

The adhesive layer 22a may be disposed between the polarizer 21 and the thin film 24, which is a polyethylene terephthalate film. The adhesive layer 22a may be formed of a water-soluble adhesive considering adherence to the thin film 24, which is a polyethylene terephthalate film.

The water-soluble adhesive may include a polyvinyl alcohol compound, a cross-linking agent, and water.

The polyvinyl alcohol compound may include, for example, a polyvinyl alcohol compound including a carboxylic acid group, or a polyvinyl alcohol compound including an amino group, etc. The polyvinyl alcohol compound may be included in an amount of, e.g., about 0.1 to about 20 parts by weight based on 100 parts by weight of water.

The cross-linking agent may be a compound having a hydrophilic aldehyde group, for example, a polyethylene imine, glyoxal, or a combination thereof.

The cross-linking agent may be included in an amount of, e.g., about 0.5 wt % to about 1.5 wt % based on the amount of the polyvinyl alcohol compound (based on a solid as a reference). When it is included within the range, it may improve initial adherence to a polyethylene terephthalate film and simultaneously strengthen durability of an adhesive.

In the example embodiment shown in FIG. 2, auxiliary adhesive layers 25a and 25b are respectively disposed between the thin film 24, which is a polyethylene terephthalate film, and the coating layer 26, and between the thin film 24, which is a polyethylene terephthalate film, and the adhesive layer 22a.

The auxiliary adhesive layers 25a and 25b may include a material with similar properties to a polyethylene terephthalate film, for example, a polyester-based resin, a polyvinyl acetate-based resin, or a combination thereof.

The auxiliary adhesive layer 25a may serve to fasten the coating layer 26 on the thin film 24, which is a polyethylene terephthalate film. Accordingly, it may prevent deterioration of display characteristics of the coating layer 26 on the thin film 24 due to a loose coating layer. In addition, the auxiliary adhesive layer 26a may allow the adhesive layer 22b to be uniformly disposed on the thin film 24, which is a polyethylene terephthalate film, e.g., by providing a leveling function.

In the example embodiment shown in FIG. 2, the optical compensation film 27 is disposed beneath the polarizer 21. The optical compensation film 27 may be made of, for example, an acryl-based compound, a cellulose compound, an olefin compound, and the like, and may regulate optical characteristics of light passing through the liquid crystal panel 10 and thus adjust the phase difference or improve the viewing angle.

In the example embodiment shown in FIG. 2, the adhesive layer 22b is disposed between the polarizer 21 and the optical compensation film 27. The adhesive layer 22b may be formed of the same water-soluble adhesive as the aforementioned adhesive layer 22a considering adherence to the thin film, which is a polyethylene terephthalate film.

In the example embodiment shown in FIG. 2, the releasing film 30 is disposed beneath the optical compensation film 27 and is removed when the polarizing plate 11 is attached to a liquid crystal panel 10. Thus, the releasing film 30 is not shown in the liquid crystal display (LCD) provided in FIG. 1.

In the example embodiment shown in FIG. 2, the pressure sensitive adhesive layer 28 is disposed between the optical compensation film 27 and the releasing film 30 to adhere them together. When the front polarizing plate 11 is attached on the liquid crystal panel 10, it may be directly attached to the liquid crystal panel 10 after removing the releasing film 30.

Figure 3:
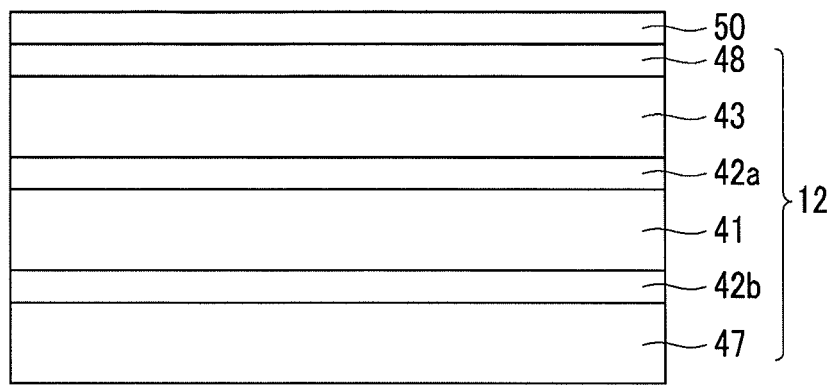
FIG. 3 illustrates a cross-sectional view of a back-side polarizing plate.

The rear polarizing plate 12 is illustrated referring to FIG. 3.

FIG. 3 illustrates a cross-sectional view of a back-side polarizing plate.

Referring to FIG. 3, the rear polarizing plate 12 may include a polarizer 41, an optical compensation film 43 on the polarizer 41, a protection layer 47 beneath the polarizer 21, an adhesive layer 42a adhering the polarizer 41 to the optical compensation film 43, and an adhesive layer 42b adhering the polarizer 21 to the protection layer 47. In the example embodiment shown in FIG. 3, a releasing film 50 is disposed on the optical compensation film 43, but it may be removed when the rear polarizing plate 12 is attached to the back side of the liquid crystal panel 10. A pressure sensitive adhesive layer 48 is disposed between the optical compensation film 43 and the releasing film 50.

The polarizer 41, the optical compensation film 43, the releasing film 50, and the pressure sensitive adhesive layer 48 may be formed substantially equivalent to those of the aforementioned front polarizing plate 11. The protection layer 47 may be formed of, e.g., one or more of triacetyl cellulose (TAC), cellulose acetate propionate, WV-TAC (wide view-TAC), etc.

According to an example embodiment, the rear polarizing plate 12 may not include a polyethylene terephthalate thin film as a protection layer. The protective layer 47 of the rear polarizing plate 12 may directly receive light entering from the backlight part (unlike the protection layer 23 of the front polarizing plate 11). Thus, it may have a color stain. In particular, since the protection layer 23 of the front polarizing plate 11 receives light passing through the liquid crystal panel 10 and the polarizer 21, that is, polarized light, it has no color stain in the front direction, but has a color stain that may be formed in the side direction. Accordingly, a protection layer according to an example embodiment may include a coating layer adjusting the phase difference of a polyethylene terephthalate film and having a haze value within a predetermined range, and thus may not have a color stain formed at the side. On the other hand, the protection layer 23 of the rear polarizing plate 12 may receive light directly entering from the backlight part without polarization. Herein, the non-polarized light may leak a lot, since the non-polarized light may be polarized while passing a polyethylene terephthalate protection layer and may then be distorted while passing the polarizer. This light leakage may appear as a color stain outside and thus may degrade display characteristics. According to an example embodiment, this color stain may be prevented by including a protection layer 23 including a polyethylene terephthalate film 24 in the front polarizing plate 11. The protection layer may also decrease the cost. The back polarizing plate 12 may include the protection layer 47 that is able to prevent the above color stain.

The aforementioned liquid crystal display (LCD) may have various modes, for example, a TN (twisted nematic) mode, a VA (vertical alignment) mode, and a coplanar electrode (CE) mode such as IPS (in-plane switching) and FFS (fringe field switching). The TN mode liquid crystal display (LCD) may further include a WV (wide view) compensation film positioned on the other side of the polyethylene terephthalate thin film 24 and including discotic liquid crystal. The VA mode liquid crystal display (LCD) may further include a drawn TAC-based compensation film on the other side of the polyethylene terephthalate thin film 24. The coplanar electrode (CE) mode liquid crystal display (LCD) may further include an A plate, a C plate, or a mixed compensation film thereof on the other side of the polyethylene terephthalate film 24. Herein, the A plate may be an optical delay layer including a positive birefringence liquid crystal material with extraordinary and ordinary axes. The extraordinary axis is parallel to the flat side of the layer. The ordinary axis is vertically arranged against the flat side of the layer. The C plate may be an optical delay layer including a positive birefringence liquid crystal material with a single extraordinary axis. The extraordinary axis is vertically arranged against the flat side of the layer, that is to say, parallel to light vertically entering therein.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

<Fabrication of a Polarizer>

One mole of polyvinyl alcohol was mixed with 80 mol of water and completely dissolved therein at 90° C. for one hour, while being agitated together. The solution was vacuum-dried at 40° C. for 40 hours, preparing a film. The film was drawn twice at 150° C., and iodine was absorbed therein. The resulting product was drawn 2.5 times in a 40° C. aqueous boric acid solution, preparing a polarizer.

<Preparation of a Polarizing Plate>

A protective layer including a polyethylene terephthalate film and a coating layer was adhered to one side of a polarizer prepared in the aforementioned method using an adhesive, and an optical compensation film was adhered to the other side thereof.

Various phase differences of the polyethylene terephthalate film, various haze values of the coating layer, and concentrations of a cross-linking agent in an adhesive are provided in the following Table 1.

TABLE 1

|  | No. | PET Ro (And) (nm) | Coating layer Haze (%) | Adhesive Cross-linking agent concentration | Auxiliary adhesive layer |
|---|---|---|---|---|---|
| Ex. | 1 | 505 | 15 | 0.7 | polyester |
|  | 2 | 620 | 15 | 0.9 | polyester |
|  | 3 | 770 | 20 | 1.2 | polyester |
|  | 4 | 800 | 15 | 1.5 | polyester |
|  | 5 | 2000 | 20 | 1.2 | polyvinyl acetate |
|  | 6 | 1890 | 15 | 1.1 | polyvinyl acetate |
|  | 7 | 2000 | 30 | 1.3 | polyvinyl acetate + polyester |
|  | 8 | 2800 | 33 | 1.3 | polyvinyl acetate + polyester |
|  | 9 | 3000 | 35 | 1.2 | polyvinyl acetate + polyester |
| Comp. Ex. | 10 | 501 | 5 | 1.1 | polyurethane |
|  | 11 | 501 | 5 | 0.4 | polyurethane |
|  | 12 | 520 | 10 | 0.9 | polyurethane + polyester |
|  | 13 | 520 | 10 | 0.5 | polyurethane + polyester |
|  | 14 | 1800 | 5 | 1.4 | polyurethane + polyvinyl acetate |
|  | 15 | 1800 | 5 | 1.7 | polyurethane + polyvinyl acetate |
|  | 16 | 700 | 5 | 1.3 | polyester |
|  | 17 | 700 | 5 | 1.6 | polyester |
|  | 18 | 2200 | 38 | 1.2 | polyvinyl acetate |
|  | 19 | 3300 | 31 | 0.6 | polyvinyl acetate |
|  | 20 | 3500 | 35 | 1.2 | — |
|  | 21 | 3800 | 40 | 1.1 | — |

Herein, the phase difference was measured using Axo metrics, and the haze value was measured using NHD-2000 (Nippon Denshoku Kogyo Co.).

<Performance Evaluation-1>

The polarizing plates Nos. 1 to 21 were examined regarding durability and adherence appearance. The durability was evaluated by storing a polarizing plate under a thermal resistant condition of 85° C. or a thermal and humidity resistant condition of 60° C. and 95% RH in a thermo-hygrostat chamber and examining the polarizing plate adherence appearance as times passes. The adherence appearance was evaluated by checking if it has bad adherence or a loose surface.

<Performance Evaluation-2>

A liquid crystal display (LCD) for a test was fabricated by removing a front polarizing plate from a commercially-available liquid crystal display (LCD) and respectively attaching the polarizing plates Nos. 1 to 21 thereto.

The liquid crystal display (LCD) was operated by applying a voltage thereto, and was then examined if a color stain was discovered by the naked eye.

<Performance Evaluation-3>

The polarizing plates Nos. 1 to 21 were examined regarding strength and close contacting property on a coating layer, appearance status, and color stain. The strength of a surface-treated coating layer was evaluated by being scratched ten times in a cross shape with a knife, and then examining if the coating layer was unfastened.

The performance results are provided in Table 2.

TABLE 2

|  | No. | Adhesion strength (durability) | Adhesion appearance | Stain or not | Coating close contacting property |
|---|---|---|---|---|---|
| Examples | 1 | ⊚ | ⊚ | — | ⊚ |
|  | 2 | ⊚ | ⊚ | — | ⊚ |
|  | 3 | ⊚ | ⊚ | — | ⊚ |

TABLE 2-continued

| | No. | Adhesion strength (durability) | Adhesion appearance | Stain or not | Coating close contacting property |
|---|---|---|---|---|---|
| | 4 | ◎ | ◎ | — | ◎ |
| | 5 | ◎ | ◎ | — | ◎ |
| | 6 | ◎ | ◎ | — | ◎ |
| | 7 | ◎ | ◎ | — | ◎ |
| | 8 | ◎ | ◎ | — | ◎ |
| | 9 | ◎ | ◎ | — | ◎ |
| Comparative Examples | 10 | ◎ | ◎ | Δ | X |
| | 11 | X | ◎ | Δ | X |
| | 12 | ◎ | ◎ | Δ | Δ |
| | 13 | ◎ | ◎ | Δ | Δ |
| | 14 | ◎ | ◎ | ☆ | Δ |
| | 15 | ◎ | X | ☆ | Δ |
| | 16 | ◎ | ◎ | ○ | ◎ |
| | 17 | ◎ | X | ○ | ◎ |
| | 18 | ◎ | ◎ | ○ | ◎ |
| | 19 | ◎ | ◎ | ○ | ◎ |
| | 20 | ◎ | ◎ | ○ | X |
| | 21 | ◎ | ◎ | ○ | X |

\* Adhesion strength/Adhesion appearance: ◎ Good, X Poor
\* Stain or not: — no spot, Δ weak spot, ○ medium spot, ☆ strong spot
\* Coating close contacting property: ◎ Excellent, Δ Good, X Poor As shown in Table 2, the polarizing plates Nos. 1 to 9 according to the examples had excellent adhesion strength and adhesion appearance, and no color stain. In contrast, the polarizing plates Nos. 10 to 21 according to the comparative examples had color stains despite a little variation. The polarizing plates Nos. 11, 15, and 17 also had poor adhesion strength or adhesion appearance.

By way of summation and review, a polarizing plate may be provided outside of a liquid crystal panel. The polarizing plate may selectively transmit light with a particular direction from among light entered from a backlight and passed through the liquid crystal layer, and thus control polarization of the light. The polarizing plate may include a polarizer being able to polarize light to a particular direction, and a protection layer supporting and protecting the polarizer. The protection layer may be required to provide sufficiently high mechanical strength to support and protect the polarizer, as well as provide high transmittance. Generally, this protection layer may be formed as a triacetyl cellulose (TAC) film. However, the triacetyl cellulose film may be expensive and thus may increase the price of a liquid crystal display (LCD) equipped therewith.

As described above, embodiments may provide a polarizing plate that includes a protection layer that replaces a triacetyl cellulose film. Embodiments may provide a polarizer having similar transparency and mechanical strength to a triacetyl cellulose film, but at a lower cost by, using a polyethylene terephthalate film as a protective layer. In addition, the polarizer may improve display characteristics by including a coating layer that adjusts the phase difference of a polyethylene terephthalate film and applies a haze value within a predetermined range. It may also prevent a color stain, which may appear when the polyethylene terephthalate film is used as a protection layer, thereby improving the display characteristics.

According to an example embodiment, a polarizing plate includes a polarizer, a thin film transmitting light polarized by the polarizer and having an in-plane phase difference (Ro) of about 500 nm to about 3000 nm, and a coating layer positioned on one side of the thin film and having a haze value of about 15% to about 35%. Another embodiment provides a liquid crystal display (LCD) including the polarizer. The polarizing plate may include a polyethylene terephthalate film as a protection layer, and thus may have similar transmittance and mechanical strength to a triacetyl cellulose film but with a low cost. In addition, the polarizing plate may further include a coating layer adjusting the phase difference of a polyethylene terephthalate film and applying a haze value within a predetermined range. The coating layer may prevent a color stain produced due to the polyethylene terephthalate film as a protection layer, and thus may improve the display characteristic. Furthermore, the polarizing plate may have excellent adhesion strength and adhesion appearance by improving adherence between the polarizer and the protection layer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizing plate, comprising:
   a polarizer;
   a polyethylene terephthalate film on the polarizer, the polyethylene terephthalate film having an in-plane phase difference (Ro) of about 500 nm to about 3000 nm; and
   a coating layer disposed on one side of the polyethylene terephthalate film and having a haze value of about 15% to about 35%.

2. The polarizing plate as claimed in claim 1, further comprising an adhesive layer interposed between the polarizer and the polyethylene terephthalate film, wherein:
   the adhesive layer is formed of an adhesive including polyvinyl alcohol and a cross-linking agent,
   the cross-linking agent includes a compound with an aldehyde group, and
   the cross-linking agent is included in an amount of about 0.5 wt % to about 1.5 wt % based on the total amount of polyvinyl alcohol.

3. The polarizing plate as claimed in claim 2, wherein the cross-linking agent includes a polyethylene imine, glyoxal, or a combination thereof.

4. The polarizing plate as claimed in claim 2, further comprising at least one of:
   a first auxiliary adhesive layer interposed between the polyethylene terephthalate film and the adhesive layer, the first auxiliary adhesive layer including a polyester-based resin, a polyvinyl acetate-based resin, or a combination thereof; and
   a second auxiliary adhesive layer interposed between the polyethylene terephthalate film and the coating layer, the second auxiliary adhesive layer including a polyester-based resin, a polyvinyl acetate-based resin, or a combination thereof.

5. The polarizing plate as claimed in claim 1, wherein the polyethylene terephthalate film has a thickness of about 25 μm to about 60 μm.

6. The polarizing plate as claimed in claim 1, wherein the polyethylene terephthalate film includes an ultraviolet (UV) absorber, and has transmittance of less than about 10% at about 380 nm.

7. A liquid crystal display (LCD) including the polarizing plate as claimed in claim 1 disposed at a front side thereof.

8. A liquid crystal display (LCD), comprising:
- a liquid crystal panel, the liquid crystal panel including first and second substrates facing each other, and including a liquid crystal layer disposed between the first and second substrates;
- a backlight part configured to supply light to a back side of the liquid crystal panel;
- a first polarizing plate positioned at a front side of the liquid crystal panel, the first polarizing plate including:
  - a polarizer,
  - a polyethylene terephthalate film on the polarizer, the polyethylene terephthalate film having an in-plane phase difference (Ro) of about 500 nm to about 3000 nm, and
  - a coating layer disposed on one side of the polyethylene terephthalate film and having a haze value of about 15% to about 35%; and
- a second polarizing plate positioned between the liquid crystal panel and the backlight part.

9. The LCD as claimed in claim 8, further comprising an adhesive layer interposed between the polarizer and the polyethylene terephthalate film, wherein:
- the adhesive layer is formed of an adhesive including polyvinyl alcohol and a cross-linking agent,
- the cross-linking agent includes a compound having an aldehyde group, and
- the cross-linking agent is included in an amount of about 0.5 wt % to about 1.5 wt % based on the total amount of polyvinyl alcohol.

10. The LCD as claimed in claim 9, wherein the cross-linking agent includes a polyethylene imine, glyoxal, or a combination thereof.

11. The LCD as claimed in claim 9, further comprising at least one of:
- a first auxiliary adhesive layer interposed between the polyethylene terephthalate film and the adhesive layer, the first auxiliary adhesive layer including a polyester-based resin, a polyvinyl acetate-based resin, or a combination thereof; and
- a second auxiliary adhesive layer interposed between the polyethylene terephthalate film and the coating layer, the second auxiliary adhesive layer including a polyester-based resin, a polyvinyl acetate-based resin, or a combination thereof.

12. The LCD as claimed in claim 8, wherein the polyethylene terephthalate film has a thickness of about 25 μm to about 60 μm.

13. The LCD as claimed in claim 8, wherein the polyethylene terephthalate film includes an ultraviolet (UV) absorber with transmittance of less than about 10% at about 380 nm.

14. The LCD as claimed in claim 8, wherein the LCD has a TN mode, and further comprises a WV compensation film positioned on a back side of the polyethylene terephthalate film, the WV compensation film including a discotic liquid crystal.

15. The LCD as claimed in claim 8, wherein the LCD has a VA mode, and further comprises a drawn TAC-based compensation film positioned on a back side of the polyethylene terephthalate film.

16. The LCD as claimed in claim 8, wherein the LCD is a horizontal electric field type, and further comprises an A plate, a C plate, or a mixed compensation film thereof on a back side of the polyethylene terephthalate film.

* * * * *